United States Patent [19]
Brown et al.

[11] 3,725,578
[45] Apr. 3, 1973

[54] DIGITAL VIDEO RECEIVERS

[75] Inventors: Earl Franklin Brown, Piscataway; William Kaminski, West Portal, both of N.J.

[73] Assignee: Bell Telephone Laboratories, Incorporated, Murray Hill, Berkeley Heights, N.J.

[22] Filed: June 25, 1971

[21] Appl. No.: 156,805

[52] U.S. Cl. ................178/7.5 R, 178/7.5 D, 315/30
[51] Int. Cl. ...........................H04n 5/48, H01j 29/52
[58] Field of Search.............178/7.3 R, 7.5 R, 7.5 D; 315/30

[56] References Cited

UNITED STATES PATENTS 3,277,335 10/1966 Moser et al.......................178/7.5 D

*Primary Examiner*—Robert L. Griffin
*Assistant Examiner*—George G. Stellar
*Attorney*—R. J. Guenther et al.

[57] ABSTRACT

This disclosure relates to real time, all digital, video receivers wherein a linear light modulation is achieved by means of a "half-tone process." The half-tone process is effected by gating a linearly scanned electron beam with constant amplitude, variable duty cycle pulses. The duty cycle is varied in successive Nyquist intervals in a manner directly related to the binary digit content of the successive n-bit words of a received pulse code modulated (PCM) video signal. For a 7-bit conventional PCM video signal, for example, 128 different levels of light intensity can be provided for each Nyquist interval.

11 Claims, 8 Drawing Figures

INVENTORS E. F. BROWN
W. KAMINSKI
BY John K. McNarney
ATTORNEY

DIGITAL VIDEO RECEIVERS

BACKGROUND OF THE INVENTION

This invention relates to video communications systems and, more particularly, to real time, all digital, video receivers for pulse code modulated video signals.

More and more during the past decade, analog signals have been digitalized for transmission purposes. Analog picture signals present no exception to this trend. For reasons of efficiency, economy and versatility the future transmission of video or visual telephone signals will, to a large extent, be carried out digitally (see "Transmission Across Town or Across the Country" by D. W. Nast and I. Welber, *Bell Laboratories Record*, May/June 1969, pages 162–168).

In accordance with present day practice, an analog picture signal is encoded into digital form using a pulse code modulation (PCM) technique, transmitted in a digital format to one or more remote locations, and then converted back to analog form for display purposes. In the video receiver, the analog signal is typically used to intensity modulate the electron beam of the display tube. Unfortunately, the trace luminosity is not linearly related to the analog signal for intensity, or velocity, modulation. Either of the latter modulation techniques require the use of a non-linear, gamma correction circuit so as to arrive at a luminous display whose intensity is linearly related to the amplitude of the analog signal. Such corrective circuits are available, but the luminous display is still vulnerable to relative changes of the CTR transfer characteristics vis-a-vis the corrective network.

Accordingly, it is a primary object of the present invention to provide a digital video receiver whose light output is linearly related to an input pulse code modulated video signal.

In present practice, a receiver PCM video signal is first decoded or converted to analog form and the latter is then processed in the video receiver in a known manner so as to provide a luminous display of the object scene seen by the remote camera. Analog video receiver circuits do not readily lend themselves to integrated circuit techniques and even when fabricated in integrated circuit form they prove costly vis-a-vis digital integrated circuits.

Accordingly, it is a further object of the invention to provide an all digital video receiver that is simple, compact and economical.

A still further object of the invention is to provide an all digital video receiver that directly converts a received digital video signal to a proportional luminous display.

Digital video receiver-displays have been proposed heretofore, but these have typically been of special design for special purpose uses, such as the display of alphanumeric characters. For example, in U.S. Pat. No. 3,345,458, issued Oct. 3, 1967, received digital data messages are first stored in a magnetic core memory and then read out a row at a time and shown on a television monitor as a two-level luminous display (see FIG. 4 of the patent). A delayed, luminous display of two brightness levels is adequate for the presentation of alpha-numeric characters and the like, but the same is clearly inadequate for video or visual telephone service. The latter requires a real time presentation of, at least, a head-and-shoulders view of a person, who inevitably will move throughout a conversation. As pointed out in the article "Better Pictures Through Better Coding" by E. F. Brown, *Bell Laboratories Record*, April 1970, pages 116–121, a large number (e.g., one hundred) of brightness levels is required for video telephone service. A video picture with insufficient brightness levels resembles a child's choppy paint-by-numbers picture (this is called "contouring"). And, a video picture limited to two brightness levels, as per the cited patent, would constitute a very poor picture, at best.

It is, therefore, another object of the present invention to provide a real time digital video receiver for directly converting a received digital video signal to a luminous display of multitudinous brightness levels.

SUMMARY OF THE INVENTION

In accordance with the present invention, a linear relationship between a luminous receiver display and an input pulse code modulated video signal is achieved by means of a "half-tone process." The half-tone process is effected by gating a linearly scanned electron beam with constant amplitude, variable duty cycle pulses. The duty cycle is varied in successive Nyquist intervals in a manner directly related to the binary digit content of the successive *n*-bit pulse code modulated (PCM) words of a received digital bit stream. Thus, for a conventional 7-bit PCM video signal, for example, 128 different levels of light intensity can be provided for each Nyquist interval.

In accordance with one embodiment of the present invention the linearly scanned electron beam is gated (i.e., turned on) with constant amplitude, constant duration, variable duty cycle pulses. A pulse rate generator circuit serves to generate a number of gating pulses for each Nyquist interval, with the number of pulses generated in successive intervals (i.e., the duty cycle) being directly related to the binary digit content of the successive n-bit words of a received PCM video signal.

In an alternative embodiment of the invention, the aforementioned duty cycle is varied in successive Nyquist intervals by a pulse duration technique. A single, constant amplitude, gating pulse is generated for each Nyquist interval, but the duration of the same in successive intervals is varied in accordance with the content of the successive *n*-bit words of the received PCM video signal.

It is a particularly advantageous feature of the invention that the conversion of an input pulse code modulated video signal to a linearly related luminous display is carried out in accordance with digital techniques. Accordingly, video receivers constructed in accordance with the invention can be readily fabricated in integrated circuit form.

While a proportional luminous display is preferred, it is a further advantageous aspect of the invention that any desired non-linear relationship between light intensity and bit word content can be arrived at.

Digital video receivers constructed in accordance with the invention are, in addition, equally capable of handling conventional PCM, differential PCM (e.g., 3-bit DPCM), or delta modulation transmission signals.

BRIEF DESCRIPTION OF THE DRAWINGS

The invention will be more fully appreciated from the following detailed description when the same is considered in connection with the accompanying drawings in which.

DETAILED DESCRIPTION

Figure 1:
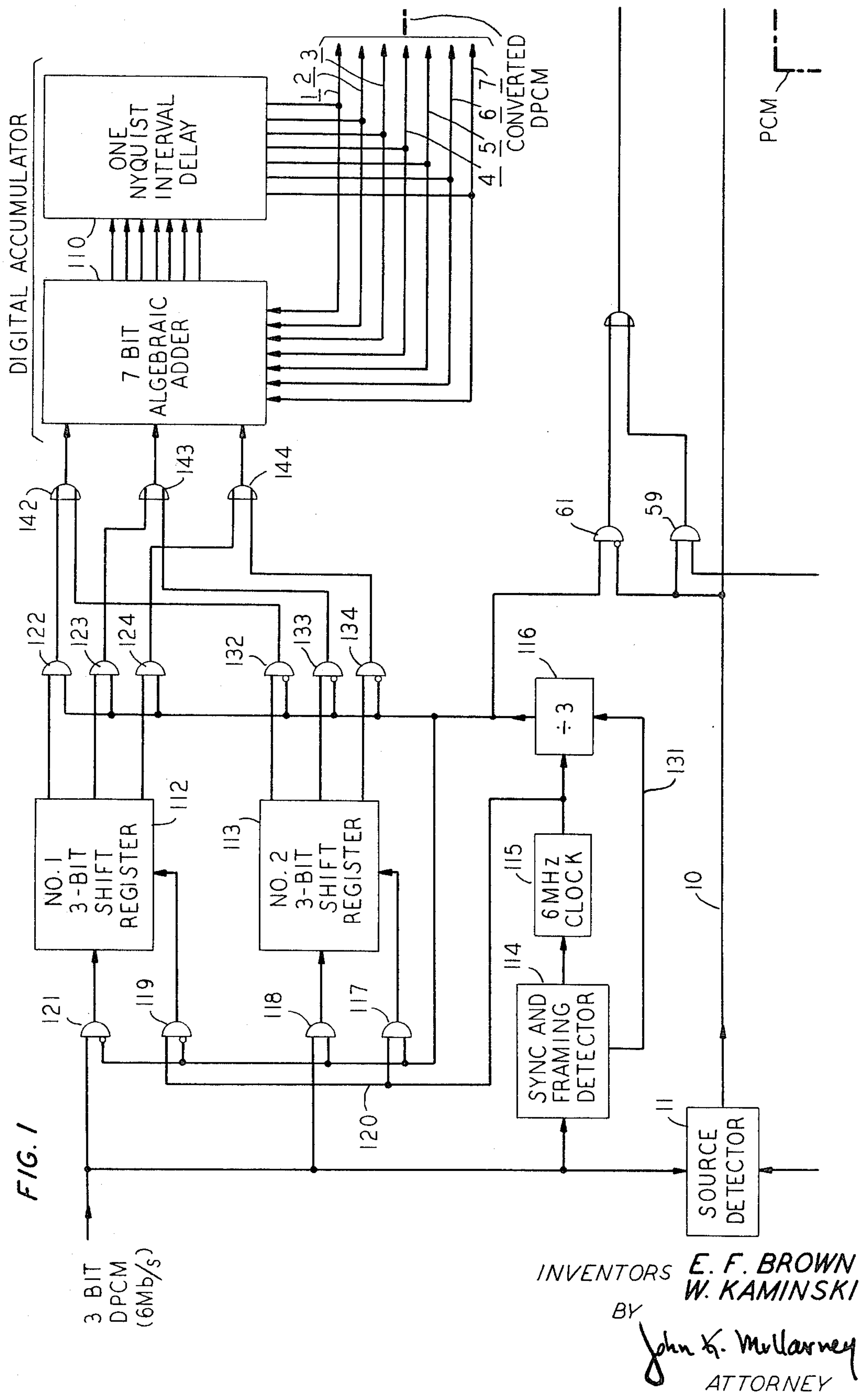
FIGS. 1 through 3, when arranged as shown in FIG. 4, illustrate a simplified schematic block diagram of a digital video receiver in accordance with the principles of the present invention.
Figure 2:
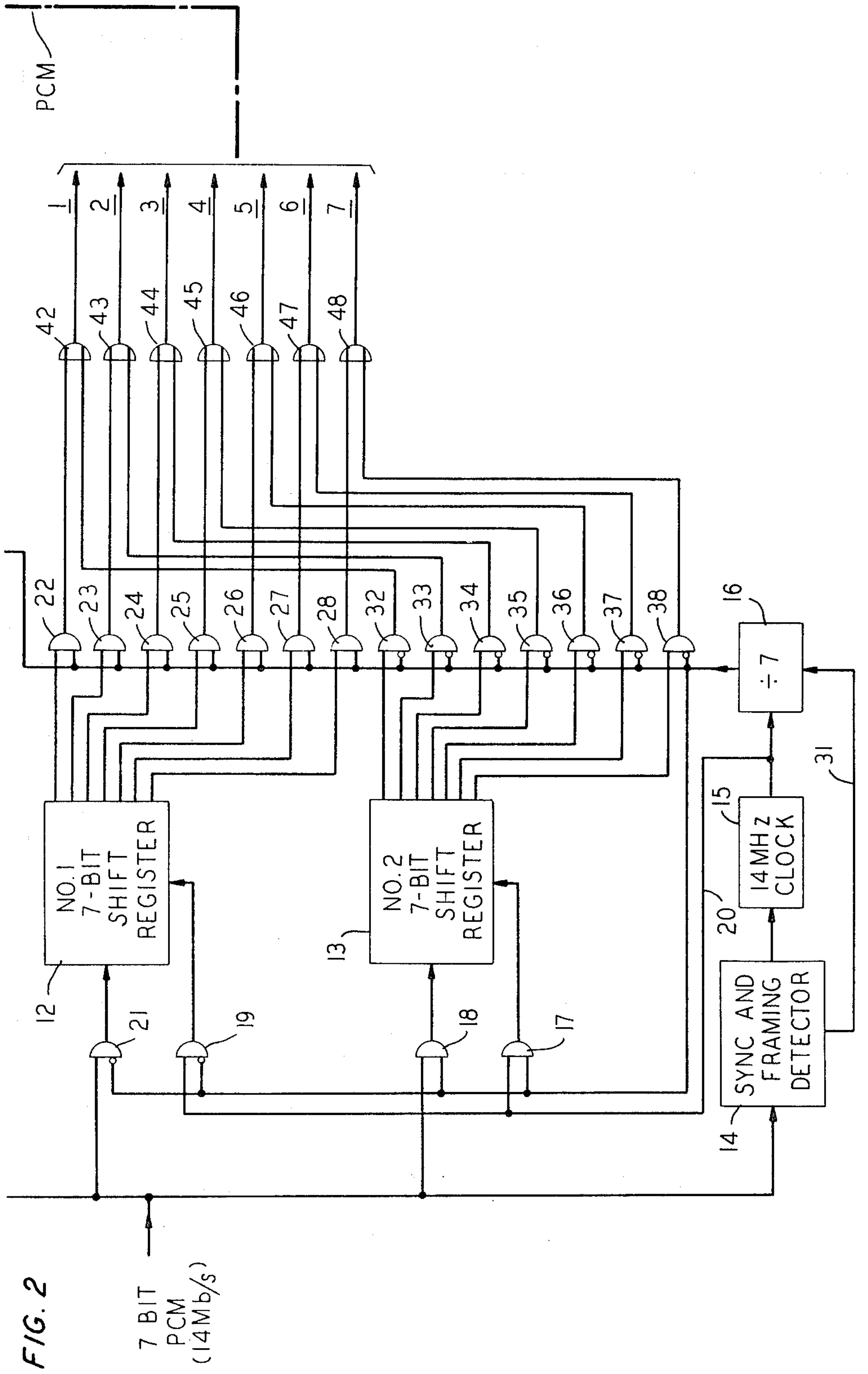
Figures 3, 4:
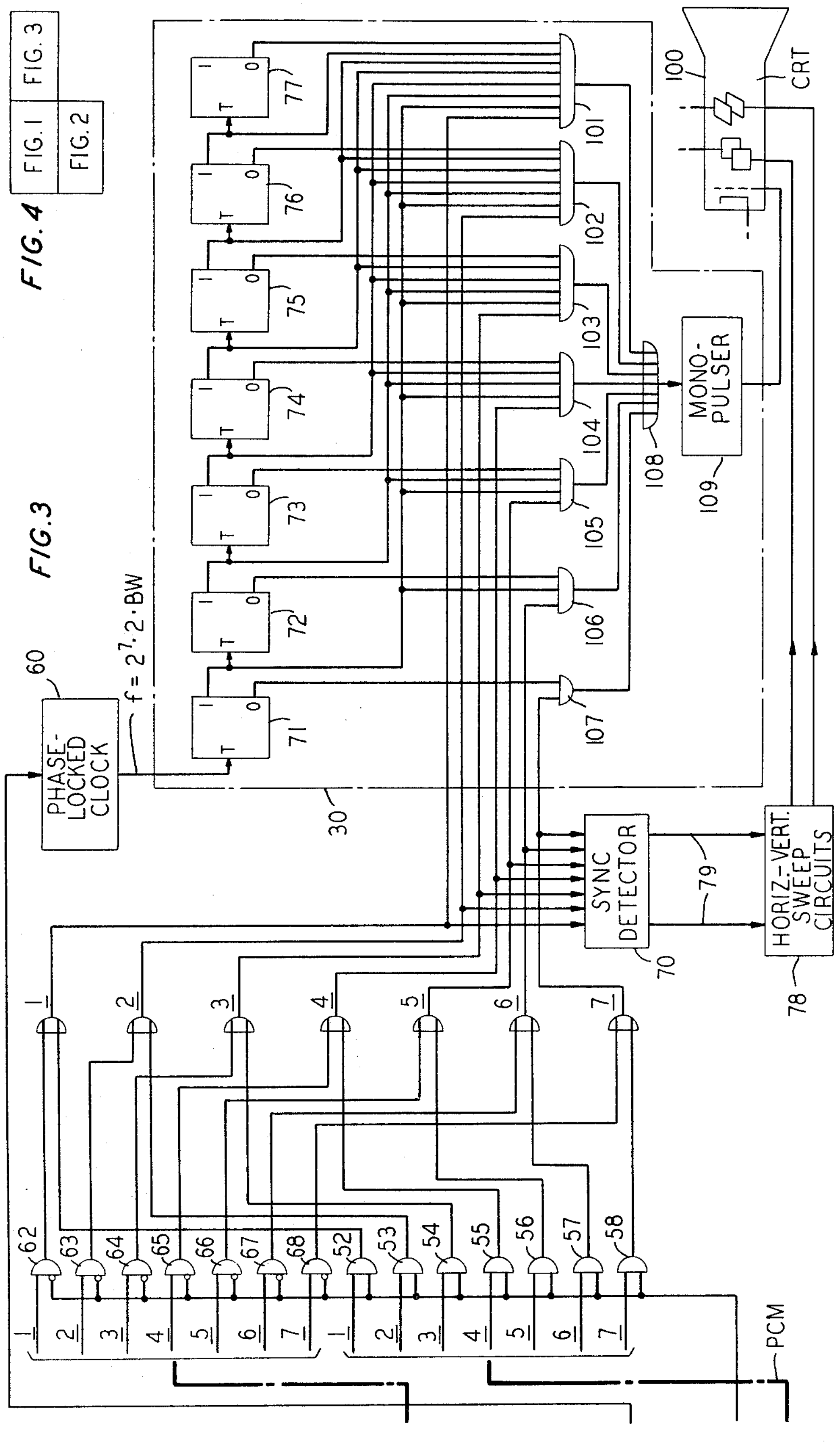

The digital video receiver shown in FIGS. 1–3 of the drawings has been designed for PICTUREPHONE service; however, as will be evident to those in the art, the principles of the invention are general and equally applicable to any type digital television service. Since the encoding and transmission of the video can be carried out using a conventional *n*-bit (e.g., 7-bit) PCM signal, or alternatively by an *n*-bit differential pulse code modulation technique, the digital receiver of FIG. 3 shows the essential circuitry for handling either of these two type inputs. It should be evident, however, that in practice a digital receiver in accordance with the invention would typically be designed to handle one or the other of these alternative digital transmission modes, but not necessarily both.

PICTUREPHONE service has been extensively described in the literature (see the May/June 1969 issue of *Bell Laboratories Record*, and the February 1971 issue of *The Bell System Technical Journal*, Vol. 50, No. 2) and hence the same will be mentioned herein only to the extent necessary. A video PICTUREPHONE signal is transmitted using a bandwidth of 1 MHz. Thus, the Nyquist sampling rate is preferably 2 MHz; and, a Nyquist interval is, of course, the reciprocal of the latter. If a 7-bit conventional pulse code modulation is assumed, for illustrative purposes, the incoming 7-bit PCM signal will thus be at a rate of 14 megabits per second (mb/s). Alternatively, if encoding and transmission is carried out by means of a 3-bit DPCM technique, for example, the incoming 3-bit DPCM signal will be at a bit rate of 6 Mb/s. Following decoding in a conventional unit or units (not shown) the baseband 7-bit PCM and 3-bit DPCM signals are delivered to the source detector 11. As the name implies, the detector 11 determines which of the input lines is active and, if desired, it can include circuitry for establishing priority between the lines if they are simultaneously active. It perhaps needs repeating at this point that the digital video receiver would typically be designed to handle either a conventional PCM or a DPCM signal, but not necessarily both. If the 7-bit PCM and 3-bit DPCM video signals are coupled to the digital video receiver of FIGS. 1–3 over a common input transmission line, the signals are still readily distinguishable in detector 11. As will be evident to those in the art a conventional n-bit PCM video signal uses a unique n-bit word for establishing the necessary synchronization signal level; whereas, a 3-bit DPCM bit stream utilizes a distinct, readily distinguishable, string of binary digit words to arrive at the requisite synchronization level.

The source detector 11 generates a signal over lead 10 which is indicative of the format of the received digital bit stream (i.e., 7-bit PCM or 3-bit DPCM) and the same is used to enable certain gates while disabling others, all in the manner to be described hereinafter.

Let us now first assume that a 7-bit conventional PCM video signal is being received. The circuitry of FIG. 2 functions primarily as a series to parallel converter for the same. That is, the series received bits of each 7-bit PCM word are converted to parallel form and thence delivered to the pulse rate generator circuit of FIG. 3. As will be explained in detail hereinafter, the pulse rate generator circuit 30 serves to generate a number of constant amplitude, constant duration, gating pulses for each parallel-presented 7-bit word, with the number of gating pulses generated per word being directly related to the binary digit content of each word.

The incoming 7-bit digital bit stream is delivered to the shift registers 12 and 13 and to the synchronization and framing detector 14. As will be explained, the series received 7-bit words are alternately read into registers 12 and 13, as well as being alternately read out therefrom. The read in to one shift register occurs simultaneously with the read out from the other, and vice versa.

The synchronization and framing detector 14 is of a conventional design and it serves to extract the necessary synchronization and bit-word framing information from the received PCM bit stream. The detector 14 delivers sync pulses to the 14 MHz clock 15 so as to phase lock the same to the incoming 14 megabit PCM signal. The output pulses of clock 15 are at a rate of 14 MHz and these are delivered, over lead 20, as shift pulses to the 7-bit shift registers 12 and 13. The pulses of clock 15 are also coupled to the input of the (7) circuit 16. The latter circuit comprises a divider, of straightforward design, having a flip-flop (not shown) as a last stage. The 1 and 0 outputs of this flip-flop will alternate in polarity for every seven input pulses from clock 15. Accordingly, for a given 7-bit interval (i.e., a Nyquist interval) the 1 output, for example, of the flip-flop of the ( 7) circuit 16 will deliver an enabling signal to AND gates 17 and 18, which signal conversely serves to disable or inhibit gates 19 and 21. In the next succeeding 7-bit interval the 1 output of circuit 16 will be of opposite polarity, and hence gates 19 and 21 will be enabled and gates 17 and 18 disabled. For the next 7-bit Nyquist interval the gate enabling-disabling operation is again reversed, and so on.

With the input gates of the shift registers 12 and 13 alternately enabled and disabled each Nyquist interval as described, it will be apparent that the successive 7-bit words of the received PCM bit stream are alternately read into the shift registers 12 and 13.

The output of the ( 7) circuit 16 is also delivered to the gates 22–28 and 32–38. As indicated in FIG. 2 of the drawings, when the input gates of shift register 12 are inhibited the output gates 22–28 are enabled, and vice versa. Correspondingly, when the input gates 17 and 18 of register 13 are enabled, the register 13 output gates 32–38 are inhibited, and vice versa. Accordingly, the series received 7-bit words are alternately read into the 7-bit shift registers 12 and 13 and are alternately read out therefrom; and, the read in to one of the 7-bit shift registers occurs simultaneously with the read out from the other, and vice versa.

The 7-bit words of the received 7-bit PCM video signal are thus converted to a parallel format and thence successively delivered to the input of the pulse rate generator circuit 30 of FIG. 3 via the OR gates 42–48.

The 7-bit shift registers 12 and 13 are conventional; the incoming signal bits are read into a register in series; the read in operation is destructive; and bit read out is in parallel. The framing detector 14 delivers a framing signal over lead 31 to the ( 7) circuit 16 to phase lock its alternating-polarity repetitive period or Nyquist-equivalent interval to that of the received PCM bit stream.

In accordance with the invention, a proportional luminous control arrangement has been devised by employing pulses of fixed pulse length and amplitude and by varying the duty cycle thereof to obtain a corresponding average output light value. The space averaged light intensity is proportional to this duty cycle:

$$I_{out} \propto I_{um} \cdot (t_p/T_1)$$

where $I_{um}$ = unmodulated light intensity; and $t_p/T_1$ = instantaneous duty cycle.
The pulsed electron beam current and spot scanning velocity of the cathode ray tube (CRT) are constant and linearity correction is therefore unnecessary.

A test was conducted on a P–31 phosphor to show that the luminance obtained from a trace was independent of the CRT spot packing density when the duty cycle is constant (the latter is achieved by using a square wave gating or blanking signal). A horizontal time base of 1 ms/cm was used and the CRT beam blanking rate was varied from $10^4$ Mb/s to $10^6$ Mb/s. The CRT spot density varied from 10 dots/cm to 1000 dots/cm. No measurable change in luminance occurred for the 100/1 change in modulating frequency. However, the light emitted by the phosphor was found experimentally to be directly proportional to the number of constant amplitude, constant duration, variable duty cycle pulses modulating the CRT electron beam.

As indicated hereinbefore, the pulse rate generator circuit 30 serves to generate a number of gating pulses for each Nyquist interval, with the number of pulses generated in successive intervals (i.e., the duty cycle) being directly related to the binary digit content of the successive 7-bit words delivered thereto via OR gates 42–48. The parallel aligned bits from OR gates 42 through 48 (designated by the numerals 1 through 7) are respectively coupled to the and gates 52 through 58 of FIG. 3. The other input to these AND gates is derived from source detector 11. With the reception of a 7-bit video signal, the source detector 11 serves to enable the AND gates 52–58, and to inhibit the gates 62–68. Also, the AND gate 59 of FIG. 1 is enabled, while the gate 61 is disabled. The enabled AND gate 59 serves to couple the output of the (= 7) circuit 16 to the clock 60 for the purpose of phase locking the same. Alternatively, however, the output of the 14 MHz clock 15 can be delivered via gate 59 to the clock 60 for phase lock purposes.

The phase-locked clock 60 is designed to operate at a frequency ($f$) equal to $2^7$ times the Nyquist sampling rate. That is, $f = 2^7 \cdot 2 \cdot$ BW, where BW is the transmission bandwidth of 1 MHz. The stream of short duration output pulses from clock 60 is delivered to the series coupled chain of toggle flip-flops 71 through 77. The clock pulse output is coupled to the toggle input of flip-flop 71 so that the same is "toggled" or alternately set or reset by each input pulse from clock 60. The (1) output lead of flip-flop 71 is connected to the toggle input of flip-flop 72 so that each time flip-flop 71 is set to its 1 state the (1) output lead thereof is energized and thereby toggles the flip-flop 72. The succeeding flip-flops 73–77 in this series coupled chain are similarly interconnected and the operation thereof is the same. Toggled flip-flops are too well known in the art to warrant detailed description herein. Since there are seven, series connected, flop-flops 71–77, the flip-flop chain will run through a complete cycle and then repeat the same for every $2^7$ (or 128) input pulses from clock 60. Thus, the flip-flop chain operates at a repetitive, cyclical rate equivalent to the Nyquist sampling rate. Or, stated conversely, the aforementioned complete cycle of this flip-flop chain occurs over a period equal to a Nyquist interval.

The AND gates 101 through 107 are respectively connected to one or more output leads of flip-flops 71–77. The AND gate 107 is connected to the (0) output lead of flip-flop 71, the AND gate 106 is connected to the (1) output lead of flip-flop 71 and to the (0) output lead of flip-flop 72, the gate 105 is connected to the (1) output leads of flip-flops 71 and 72 and to the (0) output lead of flip-flop 73, and so on as illustrated in the drawings. The parallel aligned bits designated by the numerals 1 through 7, in FIGS. 2 and 3, are respectively coupled to the AND gates 101 through 107. The numeral 1 designates the least significant bit in each 7-bit word, the numeral 7 designates the most significant bit in each 7-bit word, and the numerals 2 – 6 designate the intermediate bits of increasing significance therebetween. Thus, the most significant bit 7 is delivered to AND gate 107, the least significant bit 1 is coupled to AND gate 101, and the bits 2 – 6 of each 7-bit word are respectively coupled to gates 102– 106, as illustrated.

For simplicity in explanation it shall be assumed for present purposes that the flip-flops 71–77 are all in their reset or 0 state at the instant a 7-bit word is presented to the rate generator 30 via the gates 52–58. As will be more evident hereinafter, this assumption is unnecessary and flip-flops 71–77 can be in any random set or reset pattern at the aforementioned instant of input presentation of a 7-bit word. Now assume the binary code of the input 7-bit word happens to be 0000001. That is, a binary one bit appears only in the seventh or most significant bit position. The other six bits of this input 7-bit bit word are binary zeros. Accordingly, only the AND gate 107 of rate generator 30 will be enabled, and it will remain enabled until the input presentation of the next succeeding 7-bit word — one Nyquist interval later. During the period that AND gate 107 is so enabled, the flip-flop 71 is toggled to its set state (and then reset) 64 times (128/2) and thus 64 pulses are passed by OR gate 108 to monopulser 109. The monopulser is of conventional circuit design and it serves to generate a pulse of fixed amplitude and duration in response to each input pulse delivered by OR gate 108. More specifically, the leading edge of each input pulse to monopulser 109 initiates an output pulse therefrom. The short duration output pulses of the monopulser 109 are then used to gate (i.e., turn on) the electron beam of the cathode ray tube 100.

Let us now assume the binary code content of the next succeeding 7-bit word is 1000000. That is, a binary one bit appears only in the first or least significant bit position, and the other six bits of this 7-bit word comprise binary zeros. Accordingly, only the AND gate 101 will be enabled — and it will remain so for one Nyquist interval, i.e., until the arrival of the next 7-bit word. During this interval the flip-flop 77 is toggled or set and then reset just once and therefore only one pulse will be delivered by the OR gate 108 to the monopulser 109. Accordingly, during this Nyquist interval the monopulser delivers only a single constant amplitude, constant duration, gating pulse to the CRT 100.

Figure 5:
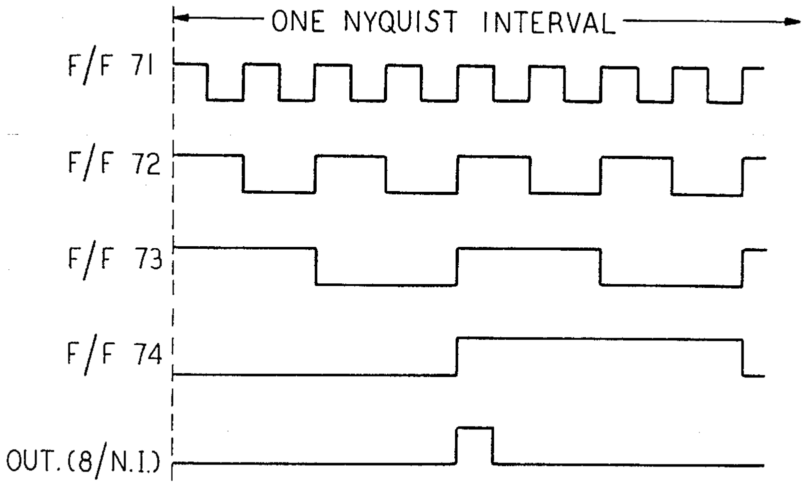
FIGS. 5–7 show certain waveforms useful in the explanation of the invention.
Figure 6:
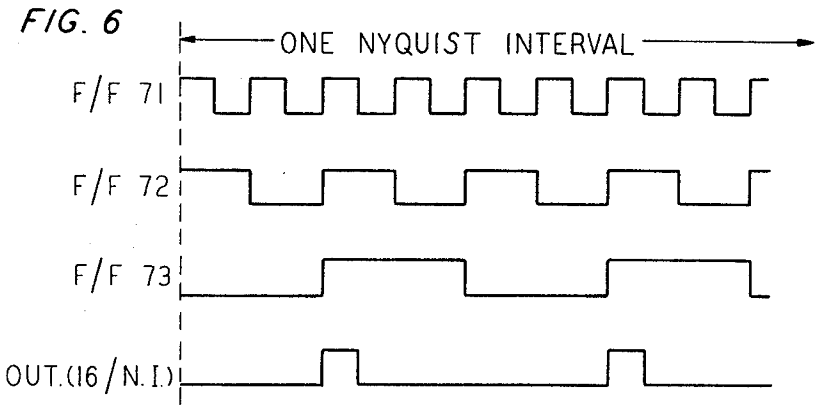
Figure 7:
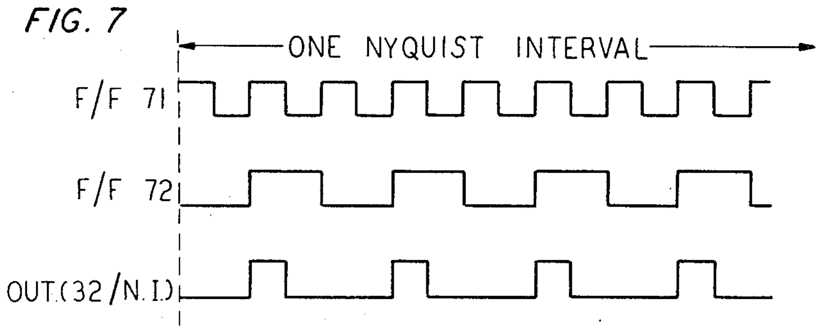

The waveforms shown in FIGS. 5–7 illustrate the operation of the rate generator circuit for other and different input 7-bit words. For example, FIG. 5 illustrates said operation when the binary code of the input 7-bit word happens to be 0001000. Thus, in the manner described, only the AND gate 104 of rate generator 30 is enabled by a binary one digit in this input word. The AND gate 104 is connected to the (1) output leads of flip-flops 71, 72 and 73 and to the (0) output lead of flip-flop 74. The input pulse or waveform patterns delivered to gate 104 from flip-flops 71–74 is illustrated in FIG. 5. When each of the flip-flop inputs to AND gate 104 is energized a short duration pulse is generated, as indicated by the waveform labeled "out" in FIG. 5. This short duration pulse is terminated when the flip-flop 71 is reset, thereby de-energizing its (1) output lead. In this fashion, the AND gate 104 serves to generate 8 pulses during the Nyquist interval.

FIG. 6 illustrates the circuit operation when the binary code of the input 7-bit word is 0000100. The AND gate 105, and only this gate, is thus enabled. The gate 105 is connected to the (1) output leads of flip-flops 71 and 72 and to the (0) output lead of flip-flop 73. The input pulse waveforms delivered to gate 105 from flip-flops 71–73 are shown in FIG. 6. Here, once again, when each of the flip-flop inputs to the AND gate 105 is energized a short duration pulse is generated, as indicated by the waveform designated "out." The AND gate 105 thus develops 16 output pulses during the Nyquist interval.

FIG. 7 illustrates the operation of the rate generator circuit when the binary code of the input 7-bit word is 0000010. The gate 106 in this instance is thereby enabled. This gate is connected to the (1) output lead of flip-flop 71 and to the (0) output lead of flip-flop 72. The resultant output comprises 32 pulses during this Nyquist interval, each pulse being generated in the manner indicated by the lowermost waveform of FIG. 7.

The following "Truth Table" summarizes the relationship between the binary code content of the 7-bit words delivered to the rate generator circuit 30 and the resultant output pulses from monopulser 109 each Nyquist interval (N. I.). For example, for the input 7-bit word 1000000, the monopulser 109 will generate one output pulse per Nyquist interval; for the input 7-bit word 0001010, the monopulser is caused to generate 40 output pulses per Nyquist interval, and so on.

| Input 7-bit word | | | | | | | | |
|---|---|---|---|---|---|---|---|---|
| 1 | 2 | 3 | 4 | 5 | 6 | 7 | Clock pulses per N. I. | Output pulses per N. I. |
| 0 | 0 | 0 | 0 | 0 | 0 | 0 | 128 | 0 |
| 1 | 0 | 0 | 0 | 0 | 0 | 0 | 128 | 1 |
| 0 | 1 | 0 | 0 | 0 | 0 | 0 | 128 | 2 |
| 0 | 0 | 1 | 0 | 0 | 0 | 0 | 128 | 4 |
| 0 | 0 | 0 | 1 | 0 | 0 | 0 | 128 | 8 |
| 0 | 0 | 0 | 0 | 1 | 0 | 0 | 128 | 16 |
| 0 | 0 | 0 | 0 | 0 | 1 | 0 | 128 | 32 |
| 0 | 0 | 0 | 0 | 0 | 0 | 1 | 128 | 64 |
| ⋮ | ⋮ | ⋮ | | ⋮ | ⋮ | ⋮ | | ⋮ |
| 0 | 1 | 1 | 0 | 0 | 0 | 0 | 128 | 6 |
| 0 | 0 | 0 | 1 | 0 | 1 | 0 | 128 | 40 |
| 1 | 0 | 0 | 1 | 0 | 1 | 0 | 128 | 41 |
| 1 | 0 | 0 | 0 | 0 | 0 | 1 | 128 | 65 |
| 0 | 0 | 1 | 0 | 0 | 1 | 1 | 128 | 100 |
| 1 | 1 | 1 | 1 | 1 | 1 | 1 | 128 | 127 |

From the foregoing table, it will be apparent that the number of CRT gating pulses generated in successive Nyquist intervals (i.e., the duty cycle) is directly related to the binary digit content of the successive 7-bit words of the received PCM video signal. The light emitted by the CRT is directly proportional to the number of constant amplitude, constant duration, variable duty cycle pulses modulating the same. Thus, for the assumed 7-bit PCM words, 128 different levels of light intensity can be provided for each Nyquist interval.

While the described linear relationship between the binary code content of the *n*-bit words of the PCM video signal and the resultant duty cycle (and CRT luminosity) is preferred, the principles of the present invention are in no way limited thereto. It should be evident at this point that by merely changing the connections of the AND gates 101–107 to the flip-flops 71–77 almost any desired non-linear relationship between CRT luminosity and bit word content can be achieved. Further, by running the clock 60 at a higher rate and utilizing one or more additional flip-flops in the series connected flip-flop chain of rate generator 30, an even greater number of brightness levels could be achieved. The limiting factor here, of course, is the "response time" of the CRT 100 — that is, the cut-off or upper limit of the rate at which the CRT can be gated on and off. Alternatively, it will be obvious that fewer than the described 128 brightness levels can also be readily achieved, if so desired.

The bits of each 7-bit word are also coupled to the input of sync detector 70 of FIG. 3. As previously indicated, an n-bit PCM video signal uses a unique code word for establishing the necessary synchronization signal level. The detector 70 serves to detect this unique code word and in response thereto it delivers horizontal and vertical sync pulses to the horizontal and vertical sweep circuits 78, via leads 79. The sync detector 70 and the horizontal and vertical sweep circuits 78 are quite conventional. The sweep circuits 78 generate the necessary horizontal and vertical deflection signals which serve to sweep the electron beam of CRT 100 in a typical raster type manner over the CRT display surface. This deflection can be carried out electrostatically or electromagnetically so long as the scan is a linear one. The display tube itself has been amply described in the literature cited, supra; the invention, however, is equally applicable to other type television display arrangements.

As indicated hereinbefore, the series coupled chain of flip-flops 71–77 runs through a complete cycle in a Nyquist interval. Thus, after 128 input pulses thereto from clock 60, the flip-flop chain will return to its initial starting condition. Accordingly, it should be apparent that flip-flops 71–77 can be in any random set or reset pattern at the instant that a 7-bit word is presented to the rate generator 30 without affecting the output duty cycle (i.e., pulses per N. I.), which is determined solely by the binary code content of the input word. For example, in any given Nyquist interval the flip-flop 77 will be set and then reset just once, irrespective of the initial state of the flip-flop chain. Accordingly, if the input 7-bit word is 1000000, the monopulser 109 will be triggered once during this Nyquist interval. Accordingly, it is not necessary, as previously assumed, for the flip-flops 71–77 to be in their reset or 0 state at the instant a 7-bit word is presented to rate generator 30.

As indicated hereinbefore, the video signal may alternatively be encoded and transmitted using an *n*-bit, differential, pulse code modulation (DPCM) technique. For present purposes of explanation a standard 3-bit DPCM transmission signal shall be assumed. If the video bandwidth is 1 MHz and the Nyquist sampling rate is again assumed to be 2 MHz, the 3-bit DPCM signal will be transmitted at a rate of 6 megabits per second (Mb/s.). This 3-bit DPCM signal is coupled to source detector 11 for the purposes previously set forth.

Much of the circuitry illustrated in FIG. 1 of the drawings serves primarily as a series-to-parallel converter for the 3-bit DPCM signal. That is, the series received bits of each 3-bit DPCM word are converted to parallel form and then delivered to the digital accumulator 110, for the purpose to be described. Since this conversion is essentially the same, both in circuitry and mode of operation, as the 7-bit series-to-parallel conversion heretofore described, the same will only be briefly explained at this point. The incoming 3-bit DPCM bit stream is delivered to the 3-bit shift registers 112 and 113 and to the synchronization and framing detector 114. As with the 7-bit conversion operation, the series received 3-bit DPCM words are alternately read into shift registers 112 and 113, as well as being alternately read out therefrom. The read in to one 3-bit shift register occurs simultaneously with the read out from the other, and vice versa. The synchronization and framing detector 114, here again, serves to extract the necessary synchronization and bit-work framing information from the received DPCM bit stream. The detector 114 delivers sync pulses to the 6 MHz clock 115 so as to phase lock the same to the incoming DPCM digital signal. The output pulses of clock 115 are delivered, over lead 120, as shift pulses to the 3-bit shift registers 112 and 113. The pulses of clock 115 are also coupled to the input of the ( 3) circuit 116. The latter circuit is of essentially the same design and operates in the same fashion as the ( 7) circuit 16. Accordingly, for a given 3-bit DPCM interval (i.e., a Nyquist interval) the ( 3) circuit 116 will deliver an enabling signal to AND gates 117 and 118, which signal conversely serves to disable or inhibit gates 119 and 121. In the next succeeding 3-bit interval the output of circuit 116 will be of the opposite polarity and hence gates 119 and 121 will be enabled and gates 117 and 118 disabled. For the next 3-bit, Nyquist, interval this gate enabling and disabling operation is again reversed and so on. Accordingly, the successive 3-bit words of the received DPCM bit stream are alternately read into shaft registers 112 and 113.

The output of the ( 3) circuit 116 is also delivered to the gates 122–124 and 132–134. As indicated in FIG. 1 when the input gates of shift register 112 are inhibited the output gates 122–124 are enabled, and vice versa. And, when the input gates 117 and 118 of register 113 are enabled the register output gates 132–134 are inhibited, and vice versa. Thus, the series received 3-bit DPCM words are alternately read into the 3-bit shift registers 112 and 13 and are alternately read out therefrom, and the read in to one of the 3-bit shift registers occurs simultaneously with the read out from the other, and vice versa.

The 3-bit words of the received 3-bit DPCM video signal are thus converted to a parallel format and thence successively delivered to the input of the digital accumulator 110 via the OR gate 142, 143 and 144.

As with the 7-bit series-to-parallel conversion circuitry of FIG. 2, the 3-bit shift registers 112 and 113 are quite conventional; the incoming signal bits are read into a register in series; this read in operation is destructive; and bit read out is in parallel. The framing detector 114 delivers a framing signal over lead 131 to the ( 3) circuit 116 to phase lock its alternating-polarity repetitive period or Nyquist-equivalent interval to that of the received DPCM bit stream.

The digital accumulator 110 serves to convert the input 3-bit DPCM video signal to a conventional 7-bit PCM signal. In essence, the accumulator 110 is the digital equivalent of the decoder utilized in a typical 3-bit DPCM transmission system. The typical DPCM decoder converts the received *n*-bit DPCM signal to an analog signal that corresponds to the original analog input to the system; whereas, the instant accumulator converts the 3-bit DPCM signal to a 7-bit PCM signal which is the digital equivalent of the original analog video signal. Digital accumulators are known in the art and extensively described in the literature; see, for example, *Computer Logic* by I. Flores, Prentice-Hall, Inc. (1960), pages 173–175. The digital accumulator utilized herein may be similar to the parallel binary accumulator illustrated on page 175 of the cited text, but the invention is of course in no way limited thereto since there are other known digital logic circuits for carrying out the intended accumulator function.

The parallel output bits of the accumulator 110 designated by the numerals 1 through 7, are respectively coupled to the gates 62 through 68 of FIG. 3. The other input to these gates is derived from source detector 11. When a 3-bit DPCM video signal is received, the source detector 11 serves to disable the AND gates 52–58 and to enable the gates 62–68. Also, the gate 61 of FIG. 1 is now enabled, while the gate 59 is disabled.

The enabled gate 61 serves to couple the output of the ( 3) circuit 116 to the clock 60 for the purpose of phase locking the same.

The converted DPCM signal is presented to the rate generator circuit 30 as successive 7-bit PCM words. The operation of the rate generator circuitry in response to the latter 7-bit words is exactly the same as heretofore described. Thus, the duty cycle is varied in successive Nyquist intervals and this variation is directly related to the binary digit content of the successive bit words of the received 3-bit DPCM video signal. And, here again, the relationship between light intensity and bit word content can be linear or non-linear, as previously described.

While a 3-bit DPCM video signal has been assumed for purposes of explanation, it will be apparent to those in the art that the invention can be utilized with any *n*-bit DPCM transmission. Delta modulation is essentially an *n*-bit DPCM transmission technique wherein $n = 1$, and hence it will be evident that the invention is equally capable of handling a delta modulated video signal. In this instance, the series-to-parallel conversion circuitry is not needed and the series received bits of the delta modulated signal are fed directly to a digital accumulator for conversion of the same to the 7-bit PCM signal. This 7-bit accumulator output is then utilized in exactly the same manner as heretofore described. An accumulator for converting a delta modulated signal to an *n*-bit PCM signal is essentially the same in logic circuit design as that noted above.

Figure 8:
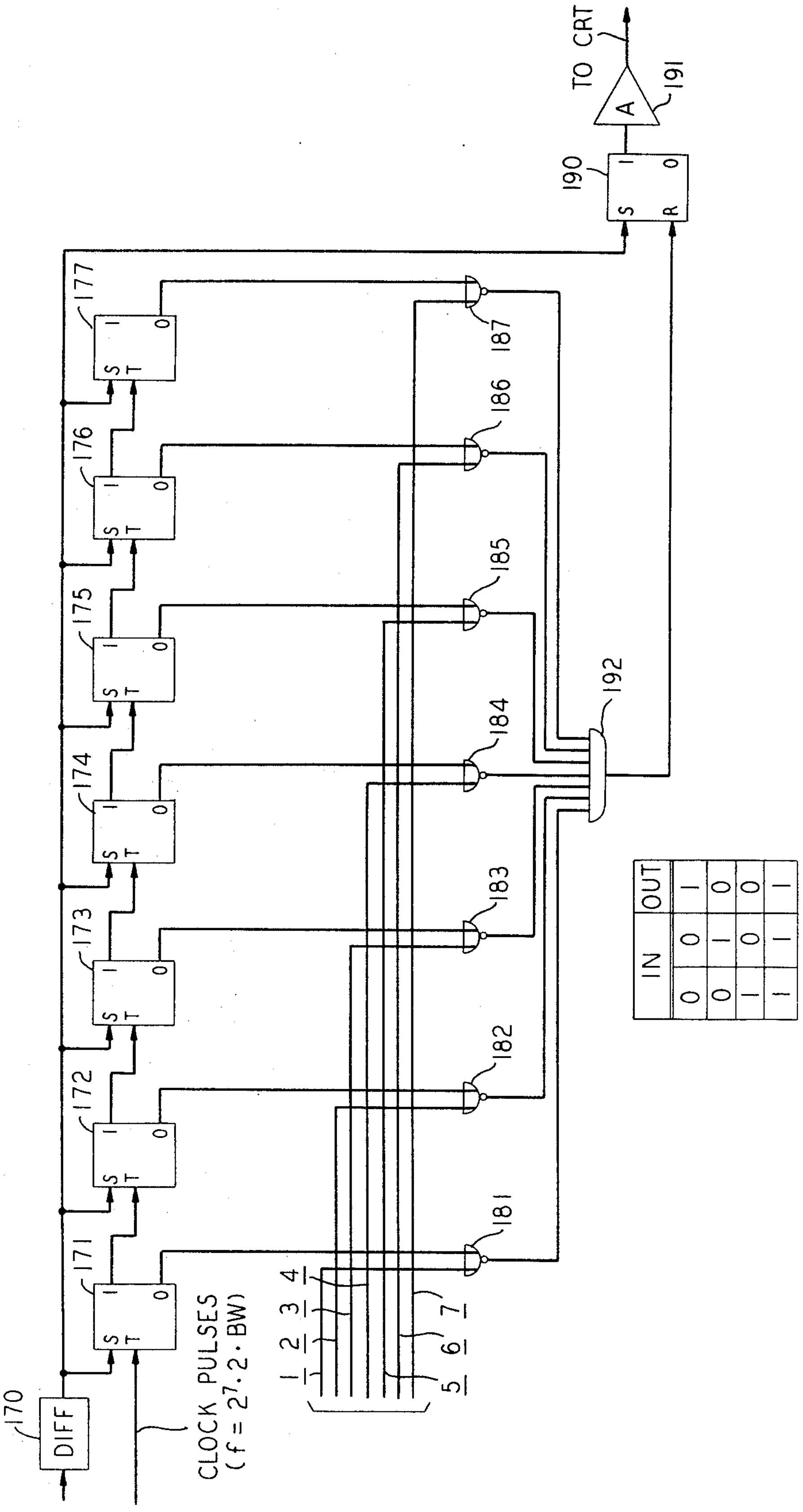
FIG. 8 is a much simplified schematic block diagram of the aforementioned alternative embodiment of the invention.

FIG. 8 illustrates an alternative embodiment of the invention wherein the duty cycle is varied in successive Nyquist intervals by a pulse duration technique. A single, constant amplitude, gating pulse is generated for each Nyquist interval, but the duration of the same in successive intervals in varied in accordance with the binary digit content of the successive *n*-bit words of a received pulse code modulated video signal.

The variable pulse duration circuitry of FIG. 8 is utilized in this instance in place of the rate generator circuit 30 of FIG. 3. The remaining portions of the digital video receiver illustrated in FIGS. 1–3 are the same and thus for the sake of brevity no further discussion thereof will be had. The previously described, parallel-aligned, input bits, designated by the numerals 1 through 7, are here respectively delivered to the inverted exclusive-OR gates 181 through 187. The bits 1 through 7 represent the binary digits of successive 7-bit words of a received 7-bit PCM video signal or, alternatively, these 7-bits may represent the converted DPCM 7-bit words from accumulator 110, all as explained hereinabove.

The input-output table shown in FIG. 8 depicts the operation of the inverted exclusive-OR gates 181–187. As the name implies, and as will be evident to those in the art, the gates 181–187 each provide a logic operation or function that is the inverse of the standard exclusive-OR function.

The gates 181 through 187 are also respectively connected to the (0) output leads of the toggle flip-flops 171 through 177. This series coupled chain of toggle flip-flops is essentially the same as the flip-flop chain 71–77 of rate generator 30. The clock pulses ($f = 2^7 \cdot 2 \cdot BW$) from the phase-locked clock 60 are coupled to the toggle input of flip-flop 171 so that the same is "-toggled" or alternatively set or reset by each input pulse from the clock. The (1) output lead of flip-flop 171 is connected to the toggle input of flip-flop 172 so that each time flip-flop 171 is set to its 1 state the (1) output lead thereof is energized and thereby toggles the flip-flop 172. The succeeding flip-flops 173–177 in this series coupled chain are similarly interconnected and the operation thereof is the same. Here again, since there are seven, series connected, flip-flops 171–177, the flip-flop chain will run through a complete cycle and then repeat the same for every $2^7$ (or 128) input pulses from clock 60. Thus, the flip-flop chain operates in a repetitive cyclical fashion over a period equal to the Nyquist interval.

For the present purpose, the repetitive cyclical operation of the flip-flop chain 171–177 should be in time correspondence with the aforementioned Nyquist intervals of the received bit stream. More specifically, the flip-flops 171–177 should preferably all be in the set or 1 state at the time a new 7-bit word is delivered to the input of the variable pulse duration circuitry of FIG. 8. To this end, the phase lock signals derived from the ( 7) circuit 16 via gate 59 or, alternatively, those derived from the (34 3) circuit 116 via gate 61 are coupled to the input of the differentiator 170 of FIG. 8. As will be recalled, these phase lock signals or waveforms correspond to the Nyquist rate. The exact phase lock signal delivered to the differentiator 170 is, of course, determined by the particular digital video signal then being received — i.e., 7-bit PCM or 3-bit DPCM. In any event, the Nyquist rate is the same. The differentiator 170 serves to generate short duration spikes that are time coincident with the leading and trailing edges of the input phase lock signal waveform and these spikes are delivered to the set (S) terminals of flip-flops 171–177 so as to set the same to their 1 state. Note, for this purpose, either the positive-going spikes that correspond to the leading edges or the negative-going spikes that correspond to the trailing edges of the input waveform should be inverted in differentiator 170. Thus, the flip-flops 171–177 are each in their set condition upon the presentation of a new 7-bit word to the variable pulse duration circuitry of FIG. 8. After the application of 128 input clock pulses to the flip-flop chain the latter will normally be returned to its initial starting condition (i.e., an all 1 or set state); this is assured by the delivery thereto of the next "set" spike from differentiator 170.

The output spikes of differentiator 170 are also coupled to the set (S) terminal of flip-flop 190. Thus, this flip-flop is also set to its 1 state at the beginning of each Nyquist interval. The (1) output lead of flip-flop 90 is coupled to the CRT 100 via amplifier 191. Accordingly, with the flip-flop 190 in its 1 state, and enabling or gating pulse is delivered to the CRT. This CRT gating pulse is terminated when the flip-flop 190 is reset in the manner to be described.

The output leads of gates 181–187 are connected to the input of AND gate 192, while the output of the latter is delivered to the reset (R) terminal of flip-flop 190.

An explanation of the operation of the variable pulse duration circuitry of FIG. 8 can perhaps thereto and thence achieved by assuming some typical inputs thereto and thence describing the resultant circuit operation. For example, assume the binary code of a newly presented 7-bit word happens to be 1111111. That is, all the input binary digits comprise binary one bits. As previously described, the flip-flops 171–177 are set to their 1 state at the time a new 7-bit word is delivered to the input of the circuitry of FIG. 8 and therefore the (0) output leads thereof are de-energized. Thus, each of the gates 181–187 is presented with a 1 and 0 input and the AND gate 192 until each of the flip-flops 171–177 is set to its 0 state. This occurs after the input of 127 clock pulses to the flip-flop chain. With the input of 127 clock pulses from clock 60, the flip-flops 171–177 are all reset to the 0 state, the gates 181–187 are now each enabled to deliver an energized binary 1 signal to AND gate 192 and the latter, in turn, then resets the flip-flop 190. Hence, the gating pulse delivered to the CRT from flip-flop 190 is essentially equal to the Nyquist interval duration.

Assume the binary code of the next input 7-bit word happens to be 0000000. That is, all of the binary input digits comprise a binary zero bit. The flip-flops 171–177 are initially set to their 1 state at the time a new 7-bit word is delivered to the variable pulse duration circuitry of FIG. 8. Thus, each of the (0) output leads of the flip-flops 171–177 is de-energized. Accordingly, as seen from the table of FIG. 8, with two 0 inputs, the gates 181–187 each deliver an enabling 1 output signal to the AND gate 192 which in turn immediately resets the flip-flop 190. Hence, the flip-flop 190 is reset immediately after having been set and thus the gating pulse delivered to the CRT is of negligible duration.

Let us now assume a 7-bit binary input word of 1000000. Thus, only a binary one bit is presently delivered to gate 181. The flip-flop chain is initially in its all 1 state. However, the next succeeding clock pulse from clock 60 serves to toggle the flip-flop 171 to its 0 state and this serves to deliver an energizing signal therefrom to the gate 181. Thus, it will be apparent, from the table of FIG. 8, the each of the gates 181–187 is presently enabled to deliver a 1 output signal. The AND gate 192, in turn, is enabled and it serves to reset the flip-flop 190. Thus, the pulse duration output from flip-flop 190 is equivalent to one-one hundred twenty eighth (1/128) of a Nyquist interval.

As another example, assume a binary input code of 0000001. A zero digit is thus delivered to the gates 181–186, while a binary one digit is delivered to the gate 187. After the input of 64 clock pulses to the flip-flop chain, the flip-flop 177 will be toggled to its 0 state. The flip-flops 171–176 are at this time in their 1 state. Accordingly, again from the table of FIG. 8, it will be apparent that each of the gates 181–187 are not enabled to deliver a 1 output signal to the AND gate 192 which, in turn, serves to reset the flip-flop 190. The flip-flop 190 is therefore reset after the 64th input clock pulse and thus the pulse duration of the gating signal to the CRT is one-half a Nyquist interval.

As a final example, let us assume the binary code of the next 7-bit input word happens to be 1000001. After the sixty-fifth input clock pulse to the flip-flop chain, the flip-flops 171 and 177 will each be set to their 0 state, while the flip-flops 172–176 will be in their 1 state. At this instant the gates 181–187 will each be enabled (as per the table), the AND gate 192 will thereby be enabled and the flip-flop 190 will then be reset. The duration of the gating pulse to the CRT will, therefore, be equal to 65/128 of a Nyquist interval.

The above examples are believed adequate o provide a proper understanding of the variable pulse duration circuitry of FIG. 8. From these examples it will be apparent that the single, constant amplitude, gating pulse generated each Nyquist interval is varied in duration in a manner directly related to the binary digit content of each input 7-bit word. The relationship between each input 7-bit word and the resultant variable duration, gating pulse is a proportional one. However, here again, it will be readily evident to those in the art that a non-linear relationship can also readily be arrived at.

As is commonly understood in the art, the expression "pulse code modulation" is a generic one and is typically used to describe a conventional n-bit PCM signal, such as that discussed in he article entitled "An Experimental Multichannel Pulse Code Modulation System of Toll Quality" by L. A. Meacham et al, *The Bell System Technical Journal*, January 1948, pages 1–43, as well as a differential pulse code modulation signal. When the expression pulse code modulation is utilized herein, without qualifying language, it is to be understood that the generic sense of the term is intended.

While the present invention has been described by reference to particular embodiments thereof, it will be understood that numerous modifications may be made by those in the art without departing from the spirit and scope of the invention.

What is claimed is:

1. A digital video receive for an *n*-bit pulse code modulated video signal comprising a cathode ray tube, pulse rate generating means having a plurality of interconnected binary circuit stages for producing pulse waveforms at binarily circuit stages for producing selectively connected to said binary circuit stages for converting the pulse waveforms to constant amplitude, variable duty cycle pulses, digital logic circuit means for coupling the bits of each n-bit word in each Nyquist interval of a received pulse code modulated video signal to said gating means to selectively enable the same during each aforementioned Nyquist interval so as to vary said duty cycle in a manner directly relative to the binary digit content of each n-bit work, and means for coupling said variable duty cycle pulses to said cathode ray tube for gating the electron beam thereof.

2. A digital video receiver as defined in claim 1 wherein the gating means serves to gate said electron beam with constant amplitude, constant duration, variable duty cycle pulses, said duty cycle being varied in successive Nyquist intervals by controlling the number of constant amplitude, constant duration gating pulses produced each Nyquist interval.

3. A digital video receiver as defined in claim 1 wherein the gating means serves to gate said electron beam with a single, constant amplitude, variable duration pulse each Nyquist interval, said duty cycle being varied in successive Nyquist intervals by controlling the pulse duration each Nyquist interval.

4. A digital video receiver as defined in claim 1 wherein the duty cycle is varied in successive Nyquist intervals in a manner that is linearly related to said binary digit content of successive *n*-bit words.

5. A digital receiver as defined in claim 1 wherein said received pulse code modulated video signal comprises a conventional *n*-bit PCM digital bit stream.

6. A digital receiver as defined in claim 1 wherein said received pulse code modulated video signal comprises an *n*-bit DPCM digital bit stream.

7. A digital video receiver for an $n$-bit pulse code modulated video signal comprising a cathode ray tube, means for linearly raster scanning the electron beam of said cathode ray tube means for gating the linearly scanned electron beam with constant amplitude, variable duty cycle pulses, the luminosity of the cathode ray display being proportional to the duty cycle of the gating pulses, and means for coupling the bits of each $n$-bit word in each Nyquist interval of a received pulse code modulated video signal to he gating means for Nyquist intervals in a manner directly related to the binary digit content of the successive $n$-bit words of said pulse code modulated signal, the gating means and the coupling means consisting entirely of digital logic circuits.

8. In a digital video receiver for an $n$-bit pulse code modulated video signal, a cathode ray tube, pulse rate generating means comprising a plurality of binary circuit stages serially coupled so as to operate in a binary counting fashion to produce pulse waveforms at binarily related rates, gating means including a plurality of digital logic gates selectively connected to said binary circuit states for converting the pulse waveforms thereof to constant amplitude, constant duration, variable duty cycle gating pulses, means composed of digital logic circuits for coupling the bits of each $n$-bit word in each Nyquist interval of a received pulse code modulated video signal to said digital logic gates to selectively enable the same during each aforementioned Nyquist interval so as to vary said duty cycle in a manner directly related to the binary digit content of each $n$-bit word, said duty cycle being varied by controlling the number of constant amplitude, constant duration, gating pulses produced each Nyquist interval, and means for coupling said gating pulses to said cathode ray tube for gating the electron beam thereof.

9. A digital video receiver as defined in claim 8 wherein the received pulse code modulated video signal comprises an n-bit DPCM digital bit stream, the n-bit coupling means including a digital accumulator means for converting each n-bit word of said received signal to a multi-bit work of $m$-bits where $m > n$, said binary circuit stages and said digital logic gates each being equal in number to the number of bits ($m$) of said multi-bit word.

10. In a digital video receiver for an $n$-bit pulse code modulated video signal, a cathode ray tube, pulse rate generating means comprising a plurality of a binary circuit stages serially coupled so as to operate in a binary counting fashion to produce pulse waveforms at binarily related rates, gating means including a plurality of digital logic gates selectively connected to said binary circuit stages for converting the pulse waveforms thereof to constant amplitude, variable duration, variable duty cycle gating pulses, means composed of digital logic circuits for coupling the bits of each $n$-bit word in each Nyquist interval of a received pulse code modulated video signal to said digital logic gates to selectively enable the same during each aforementioned Nyquist interval so as to vary said duty cycle in a manner directly related to the binary digit content of each $n$-bit word, said gating means being thus enabled to produce a single, constant amplitude, variable duration, gating pulse each Nyquist interval, said duty cycle being varied by controlling the pulse duration each Nyquist interval, and means for coupling said gating pulses to said cathode ray tube for gating the electron beam thereof.

11. A digital video receiver as defined in claim 10 wherein the received pulse code modulated video signal comprises an $n$-bit DPCM digital bit stream, the n-bit coupling means including a digital accumulator means for converting each $n$-bit word of said received signal to a multi-bit work of $m$-bits where $m > n$, said binary circuit stages and said digital logic gates each being equal in number to the number of bits ($m$) of said multi-bit word.

* * * * *

UNITED STATES PATENT OFFICE
CERTIFICATE OF CORRECTION

Patent No. 3,725,578 Dated April 3, 1973

Inventor(s) Earl F. Brown et al.

It is certified that error appears in the above-identified patent and that said Letters Patent are hereby corrected as shown below:

Column 1, line 32, "CTR" should read -- CRT --; line 38, "receiver" should read -- received --. Column 3, line 47, "(mb/s)" should read -- (Mb/s) --. Column 4, lines 41, 48 and 61, "( 7)", each occurrence, should read -- (÷7) --. Column 5, line 15, "( 7)" should read -- (÷7) --; line 56, "and" should read -- AND --; line 63, "(= 7)" should read -- (÷ 7) --. Column 6, line 18, "flop-flops" should read -- flip-flops --; line 58, "7-bit bit word" should read -- 7-bit word --. Column 8, line 5 et seq., no dotted line in column 4 of Table. Column 9, line 63, "work" should read -- word --. Column 10, lines 1, 5, 16 and 39, "( 3)", each occurrence, should read -- (÷ 3) --; line 3, "( 7)" should read -- (÷ 7) --; line 14, "shaft" should read -- shift --; line 25, "13" should read -- 113 --; line 32, "gate" should read -- gates --. Column 11, line 2, "( 3)" should read -- (÷ 3) --. Column 12, line 13, "For the present purpose" should read -- For present purposes --; line 21, "( 7)" should read -- (÷ 7) --; line 22, "(343)" should read -- (÷ 3) --. Column 12, line 52, "90" should read -- 190 --; line 63, after "perhaps" cancel "thereto and"; line 64, "thence" should read -- best be --. Column 13, line 5, after "192" insert -- is thus disabled (see table, FIG. 8) and it will remain so --; line 37, "the", second occurrence, should read -- that --; line 44, "A zero digit" should read -- A zero binary digit --; line 51, "not" should read -- now --; line 67, "o" should read -- to --. Column 14, line 13, "he" should read -- the --; line 28, "receive" should read -- receiver --; line 32, after "binarily" cancel "circuit stages for producing" and insert -- related rates, gating means --; line 40, "relative" should read -- related --; line 41, "work" should read -- word --. Column 15, line 10, "he" should read -- the --; same line after "for" insert -- varying the duty cycle of the gating pulses in successive --; line 22, "states" should read -- stages --. Column 16, line 3, "work" should read -- word --; line 9,

UNITED STATES PATENT OFFICE
CERTIFICATE OF CORRECTION

Patent No. 3,725,578 Dated April 3, 1973

Inventor(s) Earl F. Brown et al. Page - 2

It is certified that error appears in the above-identified patent and that said Letters Patent are hereby corrected as shown below:

Cancel "a", second occurrence; line 35, "work" should read -- word --.

Signed and sealed this 16th day of July 1974.

(SEAL)
Attest:

McCOY M. GIBSON, JR.
Attesting Officer

C. MARSHALL DANN
Commissioner of Patents